[54] ELECTROFORMING PROCESS

[75] Inventor: Bradley A. Carson, Monrovia, Calif.

[73] Assignee: Bell & Howell Co., Chicago, Ill.

[22] Filed: Mar. 30, 1973

[21] Appl. No.: 346,564

[52] U.S. Cl. .......... 204/4, 204/20
[51] Int. Cl. .......... C23b 7/00, C23b 5/60
[58] Field of Search .......... 204/4, 20, 30, 9, 3

[56] References Cited

UNITED STATES PATENTS

| | | | |
|---|---|---|---|
| 2,880,147 | 3/1959 | Cunningham | 204/281 |
| 3,397,125 | 8/1968 | Tapley | 204/281 |
| 3,523,824 | 8/1970 | Powers et al. | 117/227 |
| 3,642,476 | 2/1972 | Mesley | 117/160 R |
| 3,719,490 | 3/1973 | Yudelson et al. | 117/34 |

*Primary Examiner*—T. M. Tufariello
*Attorney, Agent, or Firm*—Nilsson, Robbins, Bissell, Dalgarn & Berliner

[57] ABSTRACT

An electroforming process for duplicating the surface contour of a master form. A pre-plate solution is coated on the form and comprises a combination of a metal compound capable of being reduced to its active metal constituent so as to form catalytic bonding sites for a further metal plating process, binder material comprising one or more polymer and/or polymer formers, and at least one solvent for the binder material and the metal compound. The binder material is chosen to provide a polymeric substance having poor adhesion for the form surface. The binder is dried to a polymer layer on the form and thereafter a conductive metal layer is electrolessly plated on the polymer layer. A desired thickness substantially greater than the thickness of the electrolessly plated layer is obtained by electroplating the electrolessly plated layer. The electroplated metal can then be removed from the form.

11 Claims, 1 Drawing Figure

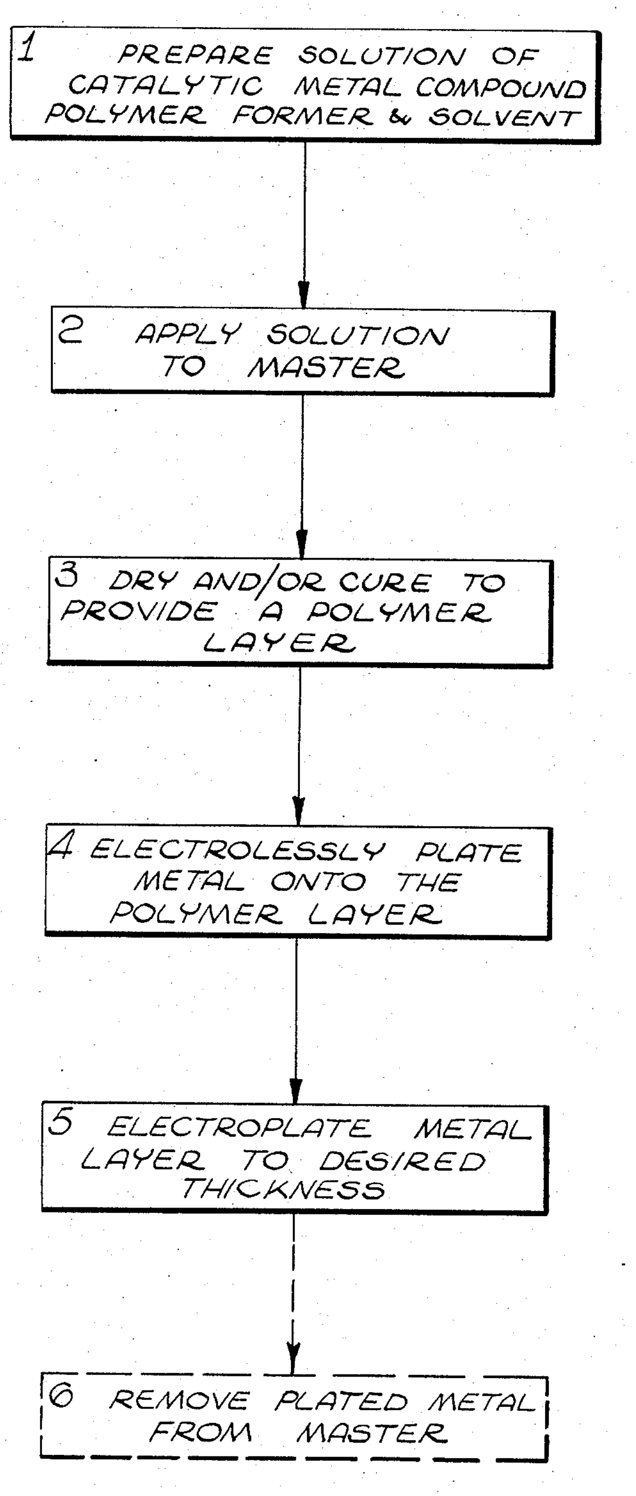
1 PREPARE SOLUTION OF CATALYTIC METAL COMPOUND POLYMER FORMER & SOLVENT
2 APPLY SOLUTION TO MASTER
3 DRY AND/OR CURE TO PROVIDE A POLYMER LAYER
4 ELECTROLESSLY PLATE METAL ONTO THE POLYMER LAYER
5 ELECTROPLATE METAL LAYER TO DESIRED THICKNESS
6 REMOVE PLATED METAL FROM MASTER

ELECTROFORMING PROCESS

FIELD OF THE INVENTION

The fields of art to which the invention pertains include the fields of electroforming, particularly with respect to providing a plate metal duplication of a surface contour, and the fields of coating processes, metal depositing processes and coating compositions.

BACKGROUND AND SUMMARY OF THE INVENTION

Electroforming of discrete components is desirable where the surface features of a form are to be reproduced with extreme fidelity. Such processes permit a high finish and intricate detail to be easily obtained and enable complex contours to be produced. Dimensional tolerances can be held to high accuracy, and maximum size is limited only by the size of the available electroplating tank. Conventional forms used in electroforming processes are made of metal, glass and plastic. Metal forms having the requisite surface regularity are usually expensive to make and their surface must be treated, such as by oxidation, to prevent adhesion of the electroformed part to the form. Glass forms are rarely used because of breakage in production. Plastic forms are desirable for their ease of manufacture and smooth, flawless surfaces. However, their use in electroforming requires pre-coating with conductive paste, a generally viscous material which masks fine details of the surface.

In U.S. patent application Ser. No. 185,106, filed Sep. 30, 1972, of common assignment hereto, there is disclosed a method of electroless metal deposition wherein the surface of a substrate is activated for electroless plating by applying a pre-plate solution having specific low viscosity characteristics. The solution comprises binder material, such as one or more polymers and/or polymer formers, specific concentrations of a compound of catalytic metal and at least one solvent for the binder material and compound. The solution is applied to the substrate, which may be plastic, and dried so as to form a polymer layer having a thickness of about 20 – 3000 A. An electroless plating solution can then be applied to the polymer coated substrate to form a layer of desired metal thereon. The metal layer is bright and generally strongly adhered to the substrate.

While strong adhesion is a detriment in an electroforming process, the foregoing pre-plate technique does have attractive features. Only a single pre-plating solution is used in such process and the substrate surface does not require special cleaning or preparation. The plastic surfaces are readily activated in a manner that does not require a special reduction step. The polymer layer is sufficiently thin (20 – 3,000 A) so that the active metal salt reduces to nucleating metal sites without special handling or reducing procedures. Reduction takes place either as the result of using moderate air drying temperatures (e.g. 50°C) or immediately upon contact with the reducing component of the electroless plating bath.

It would be desirable to have similar advantages featured in an electroforming process, that is, to be able to pre-plate with a substance having the ease of application, reduction and activation characteristics of the aforementioned pre-plate solution and yet have poor adhesion for plastic surfaces, so that an electroformed layer could be easily removed.

In accordance with the present invention, an electroforming process is provided which has all of the aforesaid preparation and handling advantages and which also provides poor adhesion to facilitate removal of the electroplated layer. The present process results from the discovery that when preplate solutions as described above are prepared with materials which provide relatively brittle polymers, the coated pre-plate layer has poor adhesion when carrying a relatively thick electroplated layer of metal. In fact, some of the binder materials referred to in the aforenoted patent application show poor adhesion following electroplating to a certain minimum thickness, although in the absence of electroplating, i.e., with only an electrolessly plated layer thereon, or with a thin electroplated layer, they show good adhesion. Generally, the thickness of the electroplated metal should be about 0.5 mil for brittle polymer layers. The polymers useful herein are glossy, brittle and water resistant. It is found that certain plastic substrates used as the form, accentuate the poor adhesion of the metal layered brittle polymers. Such plastics are generally characterized by surface gloss, having weak boundary layers, such as caused by low molecular weight ingredients migrating to or present near the surface. Solubility parameters differ from the organic solids of the pre-plate solution by greater than 2 units.

BRIEF DESCRIPTION OF THE DRAWING

The FIG. is a flow chart diagramatically outlining the principle method steps for an electroforming process for duplicating the surface contour of a master form which can then be removed.

DETAILED DESCRIPTION

In accordance with the method steps as outlined in the chart formed in the drawing, a plated metal part is prepared by a series of steps in which (1) a solution is prepared comprising binder material comprising one or more polymers and/or polymer formers, a compound of catalytic metal and solvent for the binder material and metal compound, the binder material forming a polymeric substance having poor adhesion characteristics for the master form surface, (2) the solution is applied to the master form, (3) the solution is dried and/or cured to form a polymer layer, (4) a metal layer is electrolessly plated on the polymer layer, and (5) the electrolessly plated metal layer is electroplated to a desired thickness. As indicated by the dashed line box in the figure, referred to as (6), after electroplating to the desired thickness, the plated metal can then be removed from the master due to the poor adhesion of the metal layer. It should be understood that the term "poor adhesion" refers to the ability to easily remove the plated metal layer from the form, but the layer has sufficient adhesion so that the plating process can be performed without movement of the metallayer with respect to the form. In certain instances, moreover, the plated metal can be stored on tne form until ready for use, or the form can be used as a packing and protective material during shipment of the plated metal. In some cases, the substrate can be replated after removing the metal without the necessity of re-pre-plating.

The compound of catalytic metal is a metal compound that is capable of being reduced to its active metal constituent so as to form catalytic metal bonding sites for a further metal plating process. A variety of such compounds are known to the art and they are generally compounds of one or more metals of Group IB and VIII of the periodic table, and tin, that is, copper, iron, nickel, cobalt, palladium, platinum, gold, silver, iridium, rhodium, osmium, ruthernium and tin. Palladium, platinum, gold and silver are preferred with palladium most preferred. Examples of compounds are palladium chloride, palladium acetate, palladium allyl chloride, silver bromide, palladium nitrate, palladium trimethylbenzyl ammonium nitrate, nickel hexachloropalladate, silver nitrate, gold chloride, palladium hydroxide and platinum dicarbonyl chloride, platinum tetrachloride, silver nitrate, platinium acetylacetonate, trimethyl platinum bromide, silver citrate, silver cyanide, auric chloride, and auric cyanide.

The polymers which can be used as a binder material to form a relatively brittle polymer include: urethane laquer (Cargill X-15-13-30), moisture curing urethane (Spencer Kellogg M-98), polyvinyl pyrrolidone (GAF NP-K-30), acrylic (PolyVinyl Chemical PZ-46), polyketone (Union Carbide ZKMA), polyamide (General Mills Versalon 1112) and vinyl acetate chloride maleic anhydride terpolymer (Union Carbide VMCH).

Plastic forms which work well with these polymer binder materials include forms made of: polypropylene, polyethylene, acrylic, ABS, crystal polystyrene, and polyester. The preplate solvent must be one that will not attack the surface of the substrate.

Generally, the polymer former is used in its liquid state, when it is somewhat polymerized by not fully cross-linked, but if soluble may be used in its fully reacted state, or the material may be used in its monomeric state. Mixtures of polymers and/or monomers, as well as copolymers, can be utilized. Other polymers can be chosen by actual experimentation or by reference to the publication "Stabilization of Synthetic High Polymers" (1964) by G. Ya Gordon (translated from Russian by A. Mercado), published by Daniel Davey & Co., Inc., New York, N.Y., incorporated herein by reference.

The binder material and metal compound are mixed by dissolving each in a suitable solvent and then admixing the solvents to form the pre-plate solution. A single solvent may be used to dissolve both the metal compound and binder material and, particularly with water, an emulsion may be formed. For example, acetone can be used to dissolve both palladium chloride and polyvinyl chloride. On the other hand, particular metal compounds may be insufficiently soluble in a solvent which is most suitable for a particular polymer former. In such case, one can simply choose a solvent for the metal compound which is soluble in the binder-dissolving solvent. For example, palladium acetate as the metal compound may be dissolved in benzene and then added to a cyclohexanone solution of a polyester bis (phenylisocyanate) methane based polyurethane. Other particular solvents can be chosen in accordance with solubilities of the materials desired to be combined, which solubilities can be readily determined. Subject to the requirements of viscosity characteristics of the pre-plate solution, as set forth below, any of the commom solvents can be utilized, including water, alcohols such as methanol, ethanol, and the like, acetones and other ketones such as methyl ethyl ketone, methyl isobutyl ketone and cyclohexanone, halogenated hydrocarbons such as chloroform and carbon tetrachloride, diethyl ether, petroleum ether, xylene, toluene, benzene, dimethyl formamide, dimethyl sulfozide, cellosolve acetate, methyl collosolve acetate, hexane, ethyl acetate, isophorone, mesityl oxide, tetrahydrofuran, cumene, and the like, and combinations thereof.

Generally about 0.0001 to about 1 percent by weight of the metal compound of the catalytic compound is present in the formulated pre-plate solution and the ratio of the binder material to metal component of the catalytic compound is from about 0.5 to about 20. A minimum of binder should be used, for enhancing poor adhesion between the master form and the metal layer. Such low binder material/compound ratios also provides good distribution of metal sites to yield uniform, uninterrupted plating.

It is critically important to the practice of the process as above stated that the viscosity of the pre-plate solution be sufficiently low under the conditions of its application to permit the formation of a layer of about 20 – 3,000A thick which, it will be appreciated, is much thinner by orders of magnitude than binder-activator layers generally utilized. In particular, the viscosity of the binder under the conditions of application should be equivalent to a Newtonian fluid viscosity of about 0.2 to about 100 centipoise.

There are in general two broad classes of fluids which can be used to sensitize surfaces: Newtonian and non-Newtonian fluids. By definition, a Newtonian liquid is one in which the viscosity is shear rate independent with no elastic or plastic components in the equation of motion of a part of the liquid under stress. Mathematically, $$F/A = \eta \mathring{\gamma} \qquad (1)$$

where F is the force acting on an area of the liquid (A), $\eta$ is the viscosity of the liquid, $\gamma$ is the shear exhibited by the liquid as a result of the shearing stress F/A and $\mathring{\gamma}$ is the rate of shear with time ($d\gamma/dt$). For practical purposes, minor deviations from this law are allowed while still calling a fluid a Newtonian liquid just as there are deviations from the ideal gas laws.

Most of the fluids which are useful in the above processes are Newtonian in character. It is a characteristic of these fluids that they will have a viscosity ($\eta$) between 0.2 and 100 cps, preferably between 0.2 and 10 cps to be particularly well suited for the preparation of surfaces for plating. Polymer precursors present in the pre-plating solution may form polymers, after deposition and/or cure, ranging from low to very high molecular weights. In solution form, however, they are part of the low viscosity Newtonian liquid. A practical definition of Newtonian liquid (after P. J. Flory, *Principles of Polymer Chemistry*, 1953, Cornell U. Press) is that the intrinsic viscosity [$\eta$]should be < 4 in order to be independent of the shear rate.

As is known $$[\eta] = \lim_{C \to 0} \frac{\eta_{soln}}{\eta_{solv}} - 1 \over C$$

where $\eta_{soln}$= the viscosity of the polymer soln, $\eta_{solv}$= the viscosity of the solvent and C is the concentration of polymer in solvent in terms of g/100 It is preferred that the polymers and polymer pre-cursors in this invention have $[\eta]<4$.

In the case of clearly non-Newtonian fluids, it has been found that some of these materials can be used to prepare surfaces for pre-plating. A simplified general additive equation for an elastoplastic liquid fluid may be represented as $$F/A = \eta \mathring{\gamma} - k_\gamma \quad + \theta \qquad (2)$$

where the symbols are the same as in (1) with the addition of $K$ representing the Hookean force constant (elasticity) and $\theta$ the inertial stress (plasticity).

Much more complicated equations and models are needed for many real rheological fluids. Similarly, there are many means for application of fluids to substrates. The combination of these means of application and types of fluids can result in a variety of wet coating films and film properties. Even a simple elastoviscous fluid can be characterized as a Kelvin body if the viscous and elastic forces are in parallel or a Maxwell body if the same forces are in series. The manipulation and preparation of these two types of fluids can be quite different. Many coating processes are almost as complicated as the rheology of fluids. For instance, spray coating can convert a fluid (of various types) to an aerosol which can become a homgeneous fluid after contact with the substrate. A high plastic yield value would give relatively thick films and poor coating uniformity in this case. On the other hand, a reverse kiss roll could transfer thin films of fluids of high plastic and elastic forces to another substrate through high shear and/or rate of shear if a proper balance of cohesive and adhesive forces of fluids and surfaces were maintained. In this case, the substrate would have to conform to the roller. In applications such as the coating of flat films or other substrates with a pre-plate solution, a non-Newtonian fluid might well be convenient because of the exigencies of the coating apparatus. So called "false body" (mostly due to plasticity) is particularly helpful in controlling the fluid under conditions of low shear.

Thus, even when a coating is formulated so as to have substantial elastic and plastic components, the desired end result can be characterized as that equivalent Newtonian liquid applied in a variety of ways including dip, spray and roller coating. This is particularly true for substrates with a substantially non-flat surface. In the case of a flat surface with minor imperfections, the incorporation of plastic and/or elastic components in the fluid can aid in the preparation of a less defect-free surface because of the filling-in of holes and avoidance of protrusions.

Since a non-Newtonian fluid can have a viscosity dependant on shear and shear-rate, no simple measure of its characteistics can be delineated. A description of a non-Newtonian fluid as having a given viscosity at a given shear rate is inadequate since such characteristic would be merely on point of a curve dependent on several variables. However, the results of the coating means and fluid formulation should produce substantially the same properties overall of the dry pre-plate coating as that produced by the previously mentioned Newtonian fluid having a viscosity in the range of 0.2 – 100 centipoise.

In order to control the rheology of the fluid for a particular application, one may disperse particles of organic compounds (monomer or polymer) and/or inorganic compounds, which are not necessarily catalytic and are not in a continuous phase with the pre-plate solution but which may be included for control of the rheology or final surface properties. Such particles can constitute up to about 90 percent of the weight of the pre-plate solution.

The second and third steps of the process call for applying the pre-plate solution to a master form and then drying and/or curing to form a polymer layer. Importantly, only that amount of pre-plate solution is applied which will yield a polymer layer having a thickness of from about 20to about 3,000A. It has been found that by forming such a thin layer of polymer certain advantages are obtained. In the first place, a bond is formed which is in many cases more tenacious than heretofore obtainable. Secondly, reduction of the metal compound to form nucleating sites can take place in air with only mild heating, for example during drying at 50°C, or immediately upon contact with the reducing agent in the electroless plating solution. Thirdly, by using such a thin layer, solvents need not be chosen on the basis of compatibility with the substrate, but can be chosen with regard only to solubilities for the binder material and metal compound, allowing a greater choice of materials and optimization with inexpensive components.

As above indicated, the pre-plate solution can be applied by simply dipping the master form into the solution, or by brushing, spraying or rolling the solution onto the form. Ordinary drying or curing temperatures which can be utilized with the plastic form, as well known to the art, generally range from room temperature, about 20° to about 150°C or higher. After the polymer film has dried, the coated form can be baked at about 50°–100°C for a few minutes to eliminate solvent and enhance adhesion.

In the next step (4) the activated substrate can be metallized by deposition techniques involving the catalytic reduction of the desired metal or metal alloys from a chemical plating solution to form a metal layer. Electroless deposition solutions of nickel, cobalt, copper, alloys such as nickel-iron, nickel-cobalt and nickel-tungsten-phosphorous, and the like, are well known.

In the fifth step of the process, an additional metal layer is deposited by electroplating on the electroless metal layer. For example, the electroless metal layer can be deposited to a desired thickness and then additional layers of suitable metal, such as copper or nickel, can be electroplated thereon. The electroplated layer should have a minimum thickness of 0.5 mil to ensure poor adhesion.

The sixth step is performed by removing the metal layers from the master form. Due to the poor adhesion only small amounts of force are required to remove the metal layer from the form. Since the form is a plastic mold part, many of the forms can be made quickly and easily. Therefore, the problems associated with damage to the form such as would occur with metal or glass forms are not present. In addition, since the plastic form is relatively lightweight, it can be shipped with the metal layer for protective purposes at a nominal cost.

The following examples wherein all parts are by weight, unless otherwise indicated, will further illustrate the invention.

EXAMPLE 1

A pre-plate solution is prepared by dissolving 0.05 parts of palladium chloride in 100 parts of methyl ethyl ketone and then dissolving 0.25 parts of a polyvinyl chloride copolymer (sold under the trade name Geon 222 by B.F. Goodrich) in the solution to obtain a polymer solution. A plastic substrate of acrylic serving as an electroform master is coated with the solution and air dried to form a layer of binder having a thickness about 500 A. The coated substrate is then placed for about 3 minutes in an electroless aqueous cobalt plating bath containing 3.5% $CoSO_4$, 7.0% $Al_2(SO_4)_3$, 2.0% $NaH_2PO_2$ and 15.0% NaK tartrate to form a cobalt layer thereon. Then the electrolessly plated substrate is placed in a copper electroplating bath, having the trademark UBAC I (sold by Udylite Corp., Detroit, Mich.) and plated with copper. A copper plate which forms the anode is connected to the positive side of the power supply. The plated substrate forms the cathode and is connected to the negative side of the power supply. After a period of 2 hours at 2 volts and 5 amperes, a copper layer of 1.5 mils thickness is coated on the substrate. Then the plated substrate is rinsed in water. A knife edge surface is inserted between the surface of the form and the metal coating to lift the metal coating therefrom and provide a member having a surface duplicate of the substrate.

EXAMPLE 2

The procedure of Example 1 is followed except that the electroformed metal layer is not lifted off the substrate but is shipped with the layers thereon and removed at the destination.

EXAMPLE 3

A polypropylene electroform master is dipped into the pre-plate solution of Example 1 and air dried to a thickness of about 200 A. The master is then placed for about 5 minutes in an electroless cobalt plating bath whereupon a layer of cobalt is deposited upon the master. The cobalt layered master is then placed in the copper electroplating bath described in Example 2 and plated with copper to a thickness of about 0.03 inches. The plated form is then rinsed in water and the metal layer removed by a knife edge.

EXAMPLE 4

The procedure of Example 3 is repeated except that the polypropylene master is placed for about 2 minutes in an electroless nickel plating bath of commercial composition (sold under the trade name Enplate Ni 415-A by Enthone Co.) in place of the cobalt bath. A layer of nickel is deposited on the polypropylene which can be further built up by electroplating and lifted from the form.

In each of the foregoing Examples 1–4, in place of the polymer binder indicated one can use Cargill Z-1-5-13-30 (urethane laquer), GAF NP-K-30 (polyvinyl pyrrolidone), Spencer Kellogg M-98 (moisture curing urethane), PolyVinyl Chemical PZ-46 (acrylic), Union Carbide ZKMA (polyketone), General Mills Versalon 1112 (polyamide) or Union Carbide VMCH (vinyl acetate chloride maleic anhydride terpolymer). As a plastic substrate one can use polypropylene, polyethylene, acrylic, acrylonitrite -butadiene-styrene copolymer, polystyrene, polyester, or epoxy.

I claim:

1. An electroforming process for duplicating the surface contour of a form comprising the steps of:
coating the surface of a plastic form having a surface contour to be duplicated with a mixture comprising the combination of a metal compound capable of being reduced to its active metal constituent so as to form catalytic bonding sites for a further metal plating process, binder material comprising one or more polymers and/or polymer formers, and at least one solvent for said binder material and metal compound, said binder material forming a polymeric substance having poor adhesion for said form surface;
drying said binder to a polymer layer on said form;
electrolessly plating a conductive metal layer on said polymer layer;
electroplating metal onto said electrolessly plated metal to a thickness of at least 0.5 mil; and
removing said plated metal from said form.

2. The electroforming process of claim 1 wherein said binder material forms a polymeric substance which is brittle.

3. The electroforming process of claim 1 wherein said binder material is glossy, brittle and water resistant.

4. The electroforming process of claim 1 wherein said form comprises material selected from the group consisting of polypropylene, polyethylene, acrylic, acrylonitrile-butadiene-styrene copolymer, polystyrene, polyester and epoxy.

5. The electroforming process of claim 1 in which the thickness of said polymer layer is 20–3,000 A.

6. The electroforming process of claim 1 in which said combination has a viscosity, under the conditions of its application to said form, equivalent to a Newtonian fluid viscosity of about 0.2 to about 100 centipoise.

7. The electroforming process of claim 6 in which said Newtonian fluid viscosity is about 0.2 to about 10 centipoise.

8. The electroforming process of claim 1 in which the metal of said metal compound is selected from the group consisting of tin, copper, silver, gold, iron, nickel, cobalt, ruthenium, rhodium, palladium, osmium, iridium, platinum and mixtures thereof.

9. The electroforming process of claim 8 in which said metal comprises palladium.

10. The electroforming process of claim 1 wherein said metal compound comprises palladium chloride.

11. The electroforming process of claim 1 wherein said metal compound comprises palladium acetate.

* * * * *